(12) United States Patent
Watanabe et al.

(10) Patent No.: US 6,266,032 B1
(45) Date of Patent: Jul. 24, 2001

(54) COORDINATE-INPUTTING DEVICE AND METHOD FOR MAKING SAME

(75) Inventors: Takeshi Watanabe; Takeshi Nishiyama, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/174,984

(22) Filed: Oct. 19, 1998

(30) Foreign Application Priority Data

Oct. 31, 1997 (JP) .................................................... 9-300451

(51) Int. Cl.$^7$ ................................. G09G 3/28; G09G 5/00
(52) U.S. Cl. ................................................. 345/60; 345/173
(58) Field of Search ........................................ 345/173, 179, 345/87, 60; 250/556

(56) References Cited

U.S. PATENT DOCUMENTS

| | | | |
|---|---|---|---|
| 5,455,883 | * 10/1995 | Shigata et al. | .................... 358/129 |
| 6,002,139 | * 12/1999 | Katagiri | .................... 250/556 |

FOREIGN PATENT DOCUMENTS

| | | | |
|---|---|---|---|
| 0513690 | * 11/1992 | (EP) | ................................ C03C/17/34 |
| 63-208115 | * 8/1988 | (JP) | ................................ G06F/3/03 |
| 04083741 | * 3/1992 | (JP) . | |
| 8036449A | 2/1996 | (JP) . | |

* cited by examiner

Primary Examiner—Amare Mengistu
(74) Attorney, Agent, or Firm—Brinks Hofer Gilson & Lione

(57) ABSTRACT

The coordinate-inputting device comprises a base substrate, a first electrode formed on the substrate and made of a transparent resistor layer, a plurality of electrically insulating dot spacers formed on the first electrode and kept away from one another at intervals, a second electrode, which is provided in face-to-face relation with the first electrode, is electrically insulated therefrom through the dot spacers and is made of a transparent resistor layer, and a readily deformable film formed on the second electrode. The device has a glass layer formed on the film and made of a liquid glass. The glass layer serves as a protective layer and is hard enough to reduce damages on the surface of the device as is caused by frictional contact with an input member.

7 Claims, 1 Drawing Sheet

COORDINATE-INPUTTING DEVICE AND METHOD FOR MAKING SAME

BACKGROUND OF THE INVENTION

1. Field of the Invention

This invention relates to a coordinate-inputting device with which a coordinate, at which an input member is positioned, is inputted to a computing system, and a method for making such a coordinate-inputting device.

2. Description of the Prior Art

As is particularly shown in FIG. 3, a known coordinate-inputting device includes a substrate 21 made of transparent glass, and an electrode 22 made of a transparent resistor layer and formed thereon. The electrode 22 has, on its upper side thereof, a plurality of insulating dot spacers 23 kept away from one another at intervals.

A transparent flexible film 24, which is made, for example, of polyethylene terephthalate, is formed over the dot spacers 23 through an electrode 25 made of a transparent resistor layer. A coat 27 made, for example, of an acrylic resin is further formed on the upper surface of the film 24 through an adhesive layer 26.

The film 24 is arranged in combination with the substrate 21 in such a way that the electrode 25 is disposed on the dot spacers 23 in face-to-face relation with the electrode 22, and is thus electrically insulated from the electrode 22.

In this type of coordinate-inputting device, an input member 28 is pressed or pushed against the coat 27 at a desired point until the coat layer 27 and the film 24 are, respectively, deformed to such an extent that the electrode 25 is in contact with the electrode 22 to input a coordinate corresponding to the point.

The known coordinate-inputting device makes use of the resin-based coat 27 in order to prevent the abrasion wear of the film 24. Since the coat 27 is made of a resin, this layer cannot be formed as having a desired degree of hardness. Upon repeated contact with the input member 28, there arises the problem that the coat 27 is liable to be damaged on the surface thereof.

The damaged surface is poor in appearance, with the attendant problem that the commercial value is depreciated. The resin-based coat 27 has such a high refractive index that its reflection becomes great, thus presenting the problem that light from below the substrate 21 becomes difficult to see due to the irregular reflection at the coat 27.

SUMMARY OF THE INVENTION

It is accordingly an object of the invention to provide a coordinate-inputting device which includes a glass layer formed by drying liquid glass on a film to be pressed with an input member whereby the glass layer, which is harder than a known resin-based coat, can reduce a degree of damage on frictional contact with the input member, thus being high in commercial value.

It is another object of the invention to provide a coordinate-inputting device whose glass layer is lower in refractive index than a known resin-based coat layer, with a reduced degree of irregular reflection, at the glass layer, of light from below a substrate, thereby ensuring the coordinate-inputting device having a high light transmittance.

It is a further object of the invention to provide a coordinate-inputting device having a glass layer, which is ready to deform by application of a small force from an input member when formed in a thickness, for example, of 0.5 to 10 $\mu$m, ensuring good and reliable operating properties.

It is still further object of the invention to provide a method for making such a coordinate-inputting device as mentioned above wherein a thin glass layer can be readily formed on a film in contact with an electrode by a simple manner.

According to one embodiment of the invention, there is provided a coordinate-inputting device which comprises a substrate, a first electrode formed on the substrate and made of a transparent resistor layer, a plurality of electrically insulating dot spacers formed on the first electrode and kept away from one another at intervals, a second electrode, which is provided in face-to-face relation with the first electrode, is electrically insulated therefrom through the dot spacers and is made of a transparent resistor layer, a readily deformable film formed on the second electrode, and a glass layer formed on the film whereby when the input member is pushed against the glass layer until the second electrode is in contact with the first electrode at the pushed position, a desired coordinate can be inputted at the position.

In the device, it is preferred that the glass layer is formed in a thickness of 0.5 to 10 $\mu$m.

According to another embodiment of the invention, there is also provided a method for making a coordinate-inputting device of the type which comprises a substrate, a first electrode formed on the substrate and made of a transparent resistor layer, a plurality of electrically insulating dot spacers formed on the first electrode and kept away from one another at intervals, a second electrode, which is provided in face-to-face relation with the first electrode, is electrically insulated therefrom through the dot spacers and is made of a transparent resistor layer, a readily deformable film formed on the second electrode, and a glass layer formed on the film, wherein the glass layer is formed by applying a liquid glass to the film in a desired thickness and drying the liquid glass.

In the method of the invention, it is preferred to further comprise the step of forming an adhesive layer on the film prior to the application of the liquid glass to permit easy and strong adhesion of the glass layer to the film.

PREFERRED EMBODIMENTS OF THE INVENTION

Figure 1:
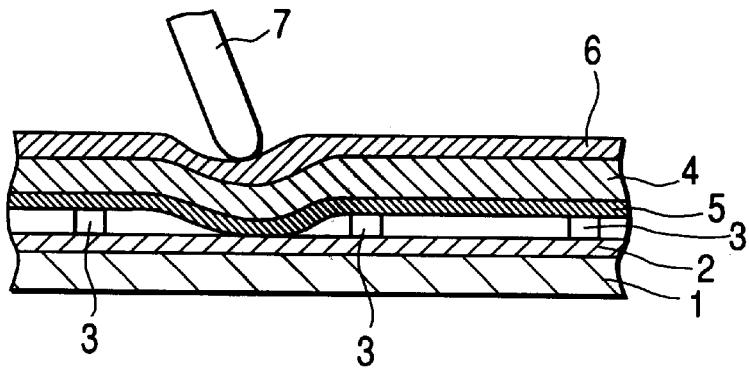
FIG. 1 is a sectional view showing an essential part of a coordinate-inputting device according to one embodiment of the invention.
Figure 2:
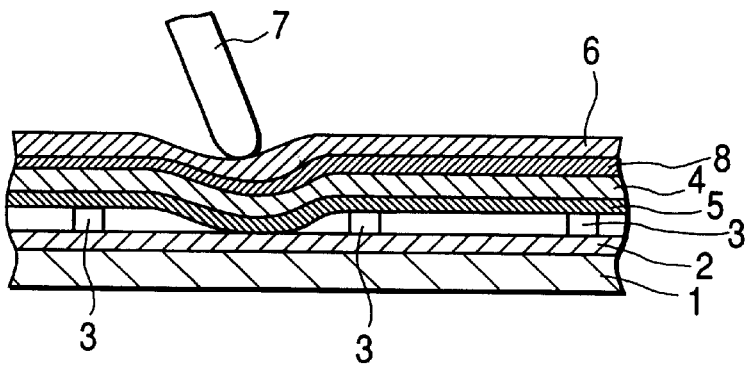
FIG. 2 is a sectional view showing an essential part of a coordinate-inputting device according to another embodiment of the invention.
Figure 3:
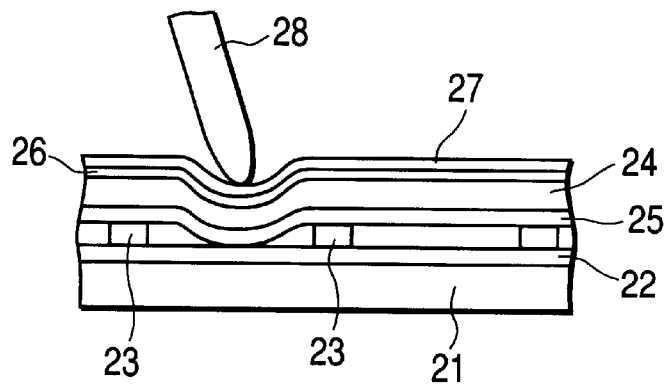
FIG. 3 is a sectional view showing an essential part of a conventional coordinate-inputting device.

The coordinate-inputting device of the invention is described with reference to FIGS. 1 and 2. FIG. 1 is a sectional view of an essential part of an coordinate-inputting device according to one embodiment of the invention, and FIG. 2 is likewise a sectional view showing an essential part of the device according to another embodiment of the invention. In these figures, similar reference numerals indicate similar parts or members, respectively.

As is particularly shown in FIG. 1, a coordinate-inputting device of the invention includes a base substrate 1 made of transparent glass, and an electrode 2 formed on the upper surface of the substrate 1 and made of a transparent resistor layer.

Plural dot spacers 3, which are kept away from one another at intervals, are formed on the upper surface of the electrode 2.

A transparent flexible film 4 made, for example, of polyethylene terephthalate, is formed on the plural dot spacers 3 through a counter electrode 5 made of a transparent resistor layer. A glass layer 6 obtained by drying liquid glass is formed on the upper surface of the film 4.

The glass layer 6 is formed by applying, onto the upper surface of the film 4, a two-component liquid glass, which is mainly composed of a liquid, solvent-free organopolysiloxane having a methyl or phenyl group, and drying the applied liquid glass.

Such a glass layer 6 is harder than the resin coat 27 discussed hereinbefore, and has a lowrefractive index and a high light transmittance. The glass layer 6 should preferably be as thin as 0.5 to 10 μm in thickness, so that this layer 6 is more likely to deform by application of a force.

The film 4 is arranged in combination with the base substrate 1 so that it permits the counter electrode 5 to be disposed on the dot spacers 3 in face-to-face relation with the electrode 2, and also permits the counter electrode 5 to be electrically insulated from the electrode 2.

The coordinate-inputting device can be fabricated according to a procedure which comprises providing a base substrate having an electrode 2 and a plurality of dot spacers 3 formed thereon in this order, separately forming an counter electrode unit having a flexible film 4 and a counter electrode 5 formed on a lower side of the flexible film 4, and a glass layer formed on the upper side of the film 4, and fixedly attaching the counter electrode unit on the plurality of dot spacers, wherein counter electrode unit is formed by forming a transparent resistor layer on the lower side of the film 4 to form the counter electrode 5, printing liquid glass on an upper surface of the film 4 to form a liquid glass layer on the upper surface, and drying the applied liquid glass layer at a temperature preferably of about 80° C. to form the glass layer 4 on the film 4.

The coordinate-inputting device having such an arrangement as set out above and made according to the method of the invention can be used in the following manner. An input member 7, such as an input pen, is softly pushed against the glass layer 6 at a desired point, so that the glass layer 6 and the film 4 are both compressively deformed until the counter electrode 5 is in contact with the electrode 2, thereby inputting a desired coordinate corresponding to the point.

FIG. 2 shows a coordinate-inputting device according to another embodiment of the invention. In this embodiment, an adhesive layer 8 is formed on the upper surface of the film 4, and the glass layer 6 made of dried liquid glass is formed on the adhesive layer 8 to obtain a coordinate-inputting device. This device has the same arrangement as in FIG. 1, except that the adhesive layer 6 is formed.

This type of coordinate-inputting device can be made in a manner similar to that of FIG. 1 except that the counter electrode unit including the film 4, electrode, adhesive layer 8 and glass layer 6 is formed in the following manner. The film 4 is initially provided, and then formed with the counter electrode 5 made of a transparent resistor layer on the lower side thereof as viewed in figure. Next, an adhesive is applied onto the upper surface of the film 4, followed by printing liquid glass on the resultant adhesive layer 8 and dried in the same manner as in the foregoing embodiment to form the glass layer 6 as shown.

The use of the adhesive ensures reliable bonding of the glass layer 6 to the film 4.

The coordinate-inputting device of the invention is advantageous in that since the glass layer 6, which is formed by drying liquid glass and has harder than known resin coats 27, is formed on the upper surface of the film 4 to be pressed with the input member 7, a degree of damage caused on contact with the input member 7 is reduced over that experienced in prior art counterparts. In addition, such an inputting device is high in commercial value.

Moreover, the glass layer 6 is lower in refractive index than the resin coat 27, and is reduced in irregular reflection of light from below the base substrate 1 at the glass layer 6. Accordingly, a coordinate-inputting device having a high light transmittance can be obtained.

When formed in a thickness of 0.5 to 10 μm, the glass layer 6 can be more readily deformed by application of a smaller force of the input member 7. Thus, the device has good operating properties and is reliable.

A thin glass layer 6 can be formed on the film by applying liquid glass and drying the applied glass, ensuring good operating properties and reliability.

When an adhesive is formed between the film 4 and the glass layer 6, good adhesion is ensured to provide a coordinate-inputting device, which is well prevented from separation of the glass layer 6.

What is claimed is:

1. A coordinate-inputting device which comprises a substrate, a first electrode formed on the substrate and made of a transparent resistor layer, a plurality of electrically insulating dot spacers formed on the first electrode and kept away from one another at intervals, a second electrode, which is provided in face-to-face relation with the first electrode, is electrically insulated therefrom through the dot spacers and is made of transparent resistor layer, a readily deformable film formed on the second electrode, and a glass layer having a desired thickness, a high hardness, a low light refractive index, and a high light transmittance, and which is deformable, said glass layer having a composition comprising an organopolysiloxane having a methyl or phenyl group and being formed on the film, whereby an input member is pressed against the glass layer at a desired point until the second electrode is in contact with the first electrode to input a coordinate corresponding to the point pressed by the input member.

2. A coordinate-inputting device according to claim 1, wherein said glass layer has a thickness of 0.5 to 10 μm.

3. A coordinate-inputting device according to claim 1, further comprising an adhesive layer between said readily deformable film and said second electrode.

4. A method for fabricating a coordinate-inputting device of the type which comprises a substrate, a first electrode formed on the substrate and made of a transparent resistor layer, a plurality of electrically insulating dot spacers formed on the first electrode and kept away from one another at intervals, a second electrode, which is provided in face-to-face relation with the first electrode, is electrically insulated therefrom through the dot spacers and is made of a transparent resistor layer, a readily deformable film formed on the second electrode, and a glass layer formed on the film, said glass layer having a high hardness, a low light refractive index, and a high light transmittance, and which is deformable, wherein the glass layer is formed by printing a liquid glass on to said film in a desired thickness and then drying the liquid glass, said liquid glass having a composition comprising an organopolysiloxane having a methyl or phenyl group.

5. A method for fabricating a coordinate-inputting device according to claim 4, wherein said liquid glass is dried at a temperature of about 80° C.

6. A method for fabricating a coordinate-inputting device according to claim 4, wherein said liquid glass has a composition comprising an organopolysiloxane having a methyl or phenyl group.

7. A method for fabricating a coordinate-inputting device according to claim 4, further comprising forming an adhesive layer between said film and said glass layer.

* * * * *